US012744228B2

(12) United States Patent
Hirawaki

(10) Patent No.: US 12,744,228 B2
(45) Date of Patent: Sep. 22, 2026

(54) FUEL CELL VEHICLE INCLUDING A PROTECTED COMPONENT

(71) Applicant: SUBARU CORPORATION, Tokyo (JP)

(72) Inventor: Aiko Hirawaki, Tokyo (JP)

(73) Assignee: Subaru Corporation, Tokyo (JP)

(*) Notice: Subject to any disclaimer, the term of this patent is extended or adjusted under 35 U.S.C. 154(b) by 503 days.

(21) Appl. No.: 18/368,402

(22) Filed: Sep. 14, 2023

(65) Prior Publication Data

US 2024/0105973 A1 Mar. 28, 2024

(30) Foreign Application Priority Data

Sep. 28, 2022 (JP) ................................ 2022-154522

(51) Int. Cl.

*H01M 8/04082* (2016.01)
*B60L 50/75* (2019.01)
*H01M 16/00* (2006.01)
*H01M 8/10* (2016.01)

(52) U.S. Cl.

CPC ......... *H01M 8/04201* (2013.01); *B60L 50/75* (2019.02); *H01M 16/006* (2013.01); *H01M 2008/1095* (2013.01); *H01M 2250/20* (2013.01)

(58) Field of Classification Search

None

See application file for complete search history.

(56) References Cited

U.S. PATENT DOCUMENTS

2020/0062135 A1* 2/2020 Hara ........................ B60L 50/71
2020/0239076 A1 7/2020 Milton et al.
2021/0362589 A1 11/2021 Morinaga
2021/0402873 A1 12/2021 Nakashima et al.

FOREIGN PATENT DOCUMENTS

JP 2011-255882 A 12/2011
JP 2019-033657 A 2/2019
JP 2020-029136 A 2/2020
JP 2021-187163 A 12/2021
JP 2022-006349 A 1/2022

OTHER PUBLICATIONS

Japanese Office Action dated Apr. 28, 2026 in Japanese Application No. 2022-154522 with English translation.

* cited by examiner

*Primary Examiner* — Zhongqing Wei
(74) *Attorney, Agent, or Firm* — McGinn IP Law Group, PLLC

(57) ABSTRACT

A fuel cell vehicle includes a protected component and a hydrogen tank unit. The protected component includes one or more of a battery, a fuel cell, and a hydrogen supply component. The hydrogen tank unit includes hydrogen tanks configured to store hydrogen gas used for power generation of the fuel cell, and a coupler coupling the hydrogen tanks to one another. The hydrogen tank unit is disposed so as to cover at least a vertically lower side of the protected component.

7 Claims, 3 Drawing Sheets

FUEL CELL VEHICLE INCLUDING A PROTECTED COMPONENT

CROSS-REFERENCE TO RELATED APPLICATIONS

The present application claims priority from Japanese Patent Application No. 2022-154522 filed on Sep. 28, 2022, the entire contents of which are hereby incorporated by reference.

BACKGROUND

The disclosure relates to a fuel cell vehicle.

In recent years, fuel cell vehicles (FCVs) have been developed. In the fuel cell vehicles, $H_2$ gas in tanks is supplied as fuel to fuel cells.

In recent years, the shape, arrangement, and the like of hydrogen tanks have been devised for reasons of increasing the cruising distance, increasing the cabin space, and the like. For example, Japanese Unexamined Patent Application Publication (JP-A) No. 2019-033657 proposes a high-pressure container unit that can be increased in capacity. JP-A No. 2011-255882 proposes a shape of a hydrogen tank that can be mounted in a limited space and that does not affect a vehicle design and a component layout. Japanese Unexamined Patent Application Publication (Translation of PCT Application) No. 2020-029136 proposes a vehicle structure for ensuring a large cabin space, while using a common hydrogen tank. JP-A No. 2022-006349 proposes an arrangement of a tank unit for increasing the cruising distance while ensuring a certain cargo space.

SUMMARY

An aspect of the disclosure provides a fuel cell vehicle. The fuel cell vehicle includes a protected component and a hydrogen tank unit. The protected component includes one or more of a battery, a fuel cell, and a hydrogen supply component. The hydrogen tank unit includes hydrogen tanks configured to store hydrogen gas used for power generation of the fuel cell, and a coupler coupling the hydrogen tanks to one another. The hydrogen tank unit is disposed so as to cover at least a vertically lower side of the protected component.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

The current technology, including the above-described related art, does not appropriately satisfy the needs of the market, and there are problems described below.

Fuel cell vehicles include batteries, fuel cells, pipes for supplying hydrogen, and the like, which are components to be protected (hereinbelow also referred to as "protected components") from an impact force caused by a collision, running on a curb, or the like. The related art, including the patent documents mentioned above, does not consider protecting the protected components from an impact force, while increasing the cruising distance, ensuring a certain cabin space, and the like. In addition, because of further increases in capacity and output of batteries these days, the needs for protecting the protected components from an impact force will be even higher.

The disclosure has been made in view of the above-described problem, and it is desirable to provide a fuel cell vehicle in which the arrangement of hydrogen tanks and high-voltage components is controlled to achieve even higher vehicle safety. Herein, to "protect" components from an impact force not only means to completely avoid application of an impact force to the components, but also to reduce the impact force to be applied.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, for convenience, the vehicle height direction is defined as the Z direction, the vehicle length direction is defined as the X direction, and the vehicle width direction, which is orthogonal to the Z and X directions, is defined as the Y direction. However, these definitions of the directions do not restrict the disclosure or unduly limit the scope of the disclosure. The configurations other than those described in detail below may be supplemented with known vehicle technologies, including the above-mentioned patent documents, battery pack structures, or circuit configurations, as necessary.

First Embodiment

Figure 1:
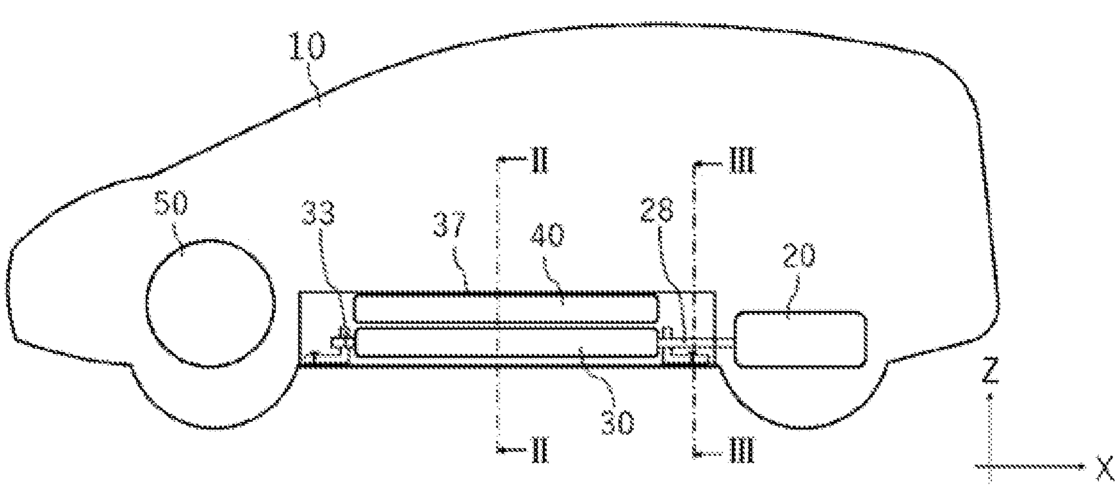
FIG. 1 is a schematic cross-sectional view of a fuel cell vehicle according to an embodiment of the disclosure, as viewed from a side.

A configuration of a fuel cell vehicle 100 according to an embodiment of the disclosure will be described with reference to FIGS. 1 to 3. The fuel cell vehicle 100 according to this embodiment includes a vehicle body 10 including a pair of left and right side frames 13. As illustrated in FIG. 1, the vehicle body 10 includes a fuel cell stack 20, hydrogen tanks 30, batteries 40, and a motor 50.

The fuel cell stack 20 generates power using hydrogen and oxygen. The hydrogen tanks 30 serve as fuel tanks that store fuel gas (hydrogen gas) to be supplied to the fuel cell stack 20. The batteries 40 are power storage devices that can be charged by receiving supply of power from the fuel cell stack 20. The motor 50 drives driving wheels of the fuel cell vehicle 100 with the power stored in the batteries 40.

The arrangement and the like of the components will be described in detail below. The fuel cell vehicle according to the present disclosure is characterized in that at least a part of protected components is covered with the hydrogen tank.

In this embodiment, the vehicle body 10 has a structure called a "monocoque structure". The vehicle body 10 includes a pair of side frames 13 disposed on the left side and the right side of the vehicle, and a center floor panel 15 that couples the pair of side frames 13 in the vehicle width direction (Y direction). Although this embodiment will be described based on an example in which the vehicle body 10 has a monocoque structure, the structure of the vehicle body 10 is not limited thereto. That is, the vehicle body 10 may have a structure called a "ladder frame structure".

The fuel cell stack 20 is a stack formed by stacking multiple (for example, 200 to 400) solid-polymer single cells, and these single cells are electrically coupled in series. Each single cell includes an electrolyte membrane (solid polymer membrane), and an anode and a cathode (electrodes) sandwiching the electrolyte membrane.

When hydrogen is supplied to the anodes of the single cells and air is supplied to the cathodes of the single cells, a potential difference (open-circuit voltage (OCV)) is generated in each single cell. Next, when the fuel cell stack 20 and an external load, such as the motor 50, are electrically coupled, and a current is taken out, the fuel cell stack 20 generates power.

The hydrogen tanks 30 store hydrogen gas to be supplied to the fuel cell stack 20. The hydrogen gas in the hydrogen tanks 30 is supplied to anode channels of the fuel cell stack 20 through a hydrogen supply component 28. The hydrogen supply component 28 is a component that causes hydrogen to flow or controls the flow of hydrogen, and includes a cutoff valve, a regulator (pressure reducing valve), an injector, an ejector, and a pipe (not illustrated).

In this embodiment, small-diameter cylindrical hydrogen tanks 30 are arranged side-by-side in front of the fuel cell stack 20. As illustrated in FIG. 2 and the like, the hydrogen tanks 30 (30*a*, 30*b*, 30*c*, 30*d* . . . ) are arranged between the front wheels and the rear wheels of the vehicle body 10 such that the longitudinal direction thereof is parallel to the front-rear direction of the vehicle body 10. However, the arrangement of the hydrogen tanks 30 is not limited to this, and, for example, the hydrogen tanks 30 may be arranged such that the longitudinal direction thereof is parallel to the width direction of the vehicle body 10. The position of the fuel cell stack 20 is not limited to the vicinity of the rear wheels, and the fuel cell stack 20 may be disposed at the front of the vehicle.

The hydrogen tanks 30 are accommodated in a hydrogen tank case 37 in such a manner that portions near ports 31 are coupled and fixed to one another with tank fixing brackets 32. In one embodiment, each of the tank fixing brackets 32 may serve as a "coupler". The tank fixing brackets 32 coupling the hydrogen tanks 30 may be fixed to the inside of the hydrogen tank case 37 with known fixing members, such as bolts.

The hydrogen tank case 37 accommodating the cylindrical hydrogen tanks 30 is disposed on the lower surface side of the center floor panel 15. As illustrated in FIGS. 2 and 3, the hydrogen tank case 37 has a substantially W-shaped cross-section and has two recesses on the upper side. The two batteries 40 are disposed in the recesses. The hydrogen tanks 30 are arranged side-by-side in the hydrogen tank case 37. With this arrangement, the vertically lower side of the batteries 40 is covered by the hydrogen tanks 30. From the standpoint of space efficiency and the cruising distance of the fuel cell vehicle 100, it is desirable that the hydrogen tanks 30 be arranged as close to each other as possible.

In this embodiment, the hydrogen tanks 30 are stacked in the height direction (Z direction) of the fuel cell vehicle 100 at at least some portions inside the hydrogen tank case 37 to cover the side surfaces of the batteries 40.

Figure 3:
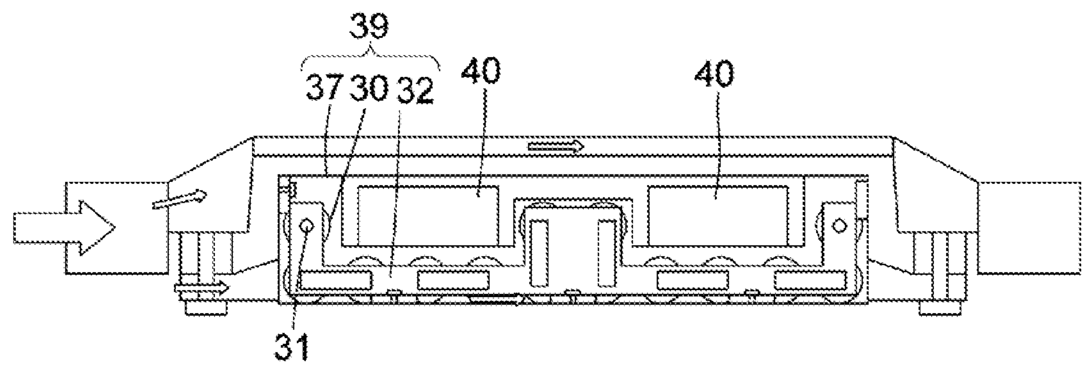
FIG. 3 is a cross-sectional view taken along line III-III in FIG. 1.
Figure 3:
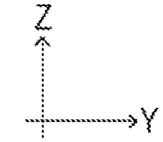

In this embodiment, as illustrated in FIG. 3, the hydrogen tank case 37, the hydrogen tanks 30 accommodated in the hydrogen tank case 37, and the tank fixing brackets 32 coupling the hydrogen tanks 30 form a hydrogen tank unit 39.

Figure 2:
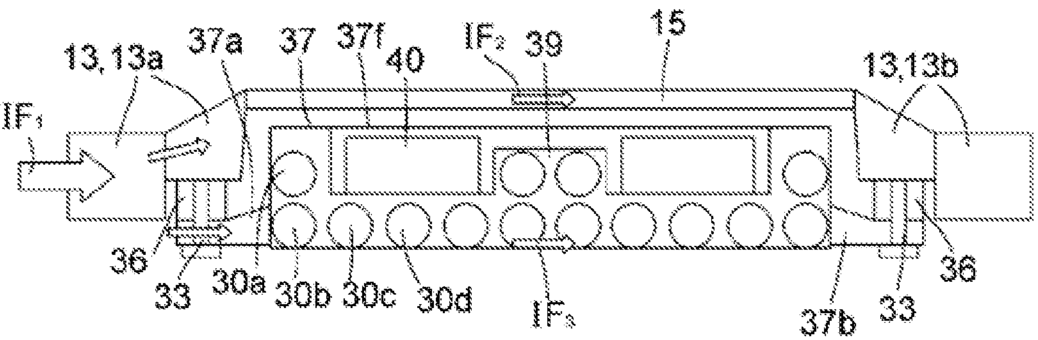
FIG. 2 is a cross-sectional view taken along line II-II in FIG. 1.
Figure 2:
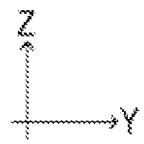

As illustrated in FIG. 2 and the like, the hydrogen tank unit 39 is fixed to a side frame 13*a* on the right side and a side frame 13*b* on the left side of the vehicle body 10 via flanges 37*a* and 37*b*. For example, the flanges 37*a* and 37*b* formed at the ends of the hydrogen tank case 37 are fixed to the side frames 13*a* and 13*b* with known bolts 33 or the like. As illustrated in FIG. 2, the flanges 37*a* and 37*b* may be fixed to the side frames 13*a* and 13*b* via known mount bushes 36 to absorb vibration.

In this embodiment, the hydrogen tank case 37 may have any shape, such as a rectangular parallelepiped, that can efficiently accommodate the hydrogen tanks 30. The hydrogen tank case 37 is desirably made of metal, such as aluminum or stainless steel, from the standpoint of strength and the like.

Figure 4:
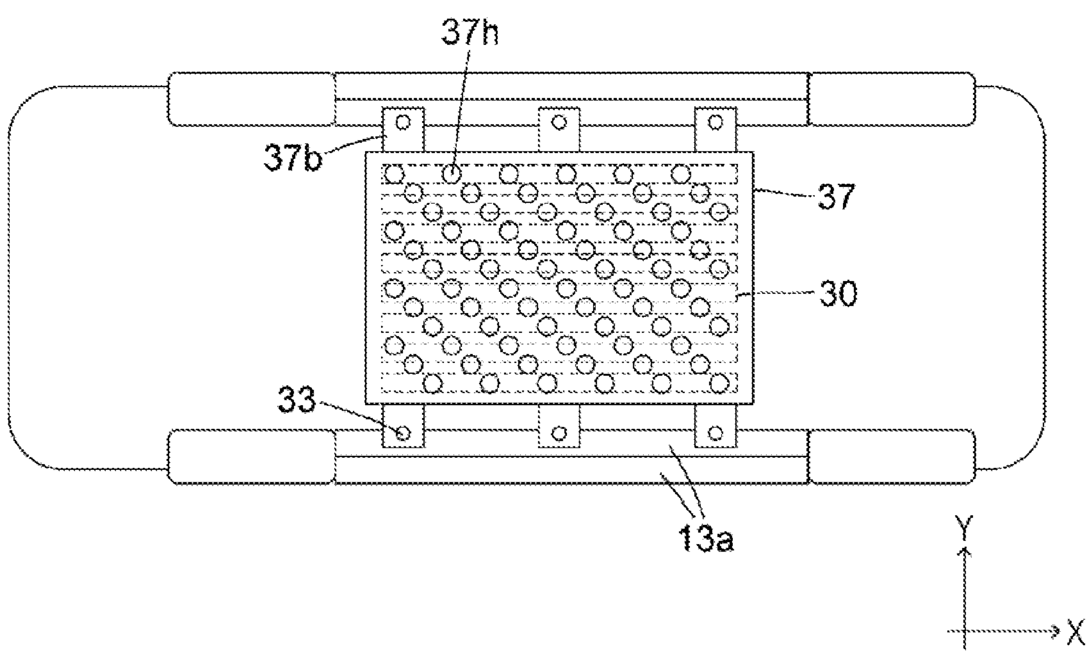
FIG. 4 is a schematic cross-sectional view of the fuel cell vehicle according to the embodiment, as viewed from the bottom.

The hydrogen tank case 37 desirably has, at at least a portion thereof, a vent hole to efficiently cool protected components described below. As illustrated in FIG. 4, by providing through-holes 37*h* at the bottom of the hydrogen tank case 37, heat in the hydrogen tank case 37 is released outside.

As illustrated in FIG. 3, the hydrogen tanks 30 accommodated in the hydrogen tank case 37 are cylindrical. However, the shape of the hydrogen tanks 30 is not limited to cylindrical, and may be a triangular prism, a quadrangular prism, or the like. A tank case cover 37*f* may be provided at the top surface of the hydrogen tank case 37.

The batteries 40 in this embodiment are power storage devices that can be charged with power supplied from the fuel cell stack 20. The batteries 40 are battery packs including, for example, lithium-ion single cells.

Advantages with First Embodiment

The thus-configured fuel cell vehicle 100 according to this embodiment has the following advantages. In this embodiment, because the hydrogen tanks 30 cover the vertically lower side of the batteries 40, the vertically lower side of the batteries 40 is protected from an impact force.

In general, the batteries 40, which are high-voltage components, are accommodated in a battery case made of resin or the like or in a thick, strong housing so as not to be broken or damaged when subjected to an impact force for some reason. Meanwhile, the walls of the hydrogen tanks 30, which store high-pressure hydrogen, are configured to have a predetermined strength. Thus, with the above-described arrangement according to this embodiment, the vertically lower side of the batteries 40 is covered with the hydrogen tanks 30 having a predetermined strength. This configuration reduces the thickness and weight of the battery case for the batteries 40, contributing to weight reduction and space saving of the overall fuel cell vehicle 100.

In this embodiment, the hydrogen tanks 30 are stacked in the height direction (Z direction) of the fuel cell vehicle 100 at at least some portions inside the hydrogen tank case 37. With this configuration, not only the vertically lower side, but also the sides of the batteries 40 are protected from an impact force with the hydrogen tanks 30, as illustrated in FIGS. 2, 3, and the like.

Furthermore, as described above, by fixing the hydrogen tank unit 39, which includes the hydrogen tanks 30 accommodated in the hydrogen tank case 37, to the left and right side frames 13 of the vehicle body 10, it is possible to prevent an impact force from the side from being directly input to the batteries 40.

The transmission of an impact force from the side will be described below.

Transmission of Impact Force in First Embodiment

The transmission of an impact force from the side in this embodiment will be described with reference to FIGS. 2 and 3. The fuel cell vehicle 100 according to this embodiment may be subjected to an impact force from the side due to various unavoidable factors. Hereinbelow, an example in which an impact force applied to the side frame 13*a* on one side is transmitted to the side frame 13*b* on the opposite side will be described.

As illustrated in FIG. 2, an impact force $IF_1$ input to the side frame 13*a* is divided into an impact force $IF_2$ to the center floor panel 15 coupled to the side frame 13*a* and an impact force $IF_3$ to the hydrogen tank case 37 coupled to the side frame 13*a* with the known bolts 33 and the like.

Next, as illustrated in FIG. 2, the impact force IF 2 and the impact force $IF_3$ are merged and transmitted to the side frame 13*b* coupled to the center floor panel 15 and the hydrogen tank case 37 at the other end.

As described in this impact-force transmission process, the impact force from the side is not directly input to the batteries 40 disposed on the hydrogen tank case 37. This way, in this embodiment, the protected components disposed on the hydrogen tank case 37 are protected from the impact force from the side of the fuel cell vehicle 100.

Because the hydrogen tank case 37 is disposed below the batteries 40, an impact force from below the fuel cell vehicle 100 is not directly input to the batteries 40, serving as the protected components. Hence, with the configuration of the fuel cell vehicle 100 according to this embodiment, it is possible to protect the protected components from an impact force from below.

With the above-described fuel cell vehicle according to this embodiment, when an impact force is input from the side or from below, it is possible to protect the protected components, such as the batteries, the fuel cell, and the hydrogen supply component, from the impact force. As described above, in this embodiment, it is possible to avoid damage to the protected components in an emergency, and to further improve the safety of the vehicle.

Second Embodiment

Figure 5:
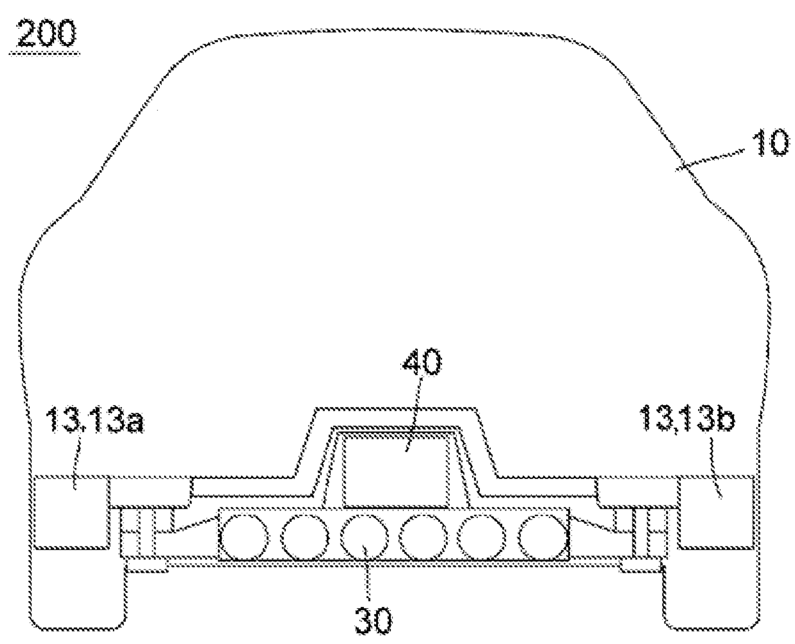
FIG. 5 is a schematic cross-sectional view of a vehicle according to an embodiment of the disclosure, as viewed from the rear.

A configuration of a fuel cell vehicle 200 according to another embodiment of the disclosure will be described with reference to FIG. 5. The fuel cell vehicle 200 according to the second embodiment differs from the fuel cell vehicle according to the first embodiment in that the hydrogen tanks 30 are disposed substantially horizontally at the lower part of the vehicle body 10, without being stacked in the height direction. Hence, the difference will be mainly described, and the same components as those of the first embodiment will be denoted by the same reference signs, and description thereof will be omitted.

The fuel cell vehicle 200 according to the second embodiment includes a vehicle body 10 including a pair of left and right side frames 13 (13*a* and 13*b*). As illustrated in FIG. 5, the vehicle body 10 includes hydrogen tanks 30 and a battery 40. The battery 40, serving as the protected component, is accommodated in a center tunnel of the fuel cell vehicle 200. The hydrogen tanks 30 are disposed substantially horizontally below the battery 40. The hydrogen tanks 30 are coupled to one another by tank fixing brackets 32 to form a raft shape. The hydrogen tanks 30 coupled in a raft shape and the tank fixing brackets 32 form a hydrogen tank unit 39. In this embodiment, the length of the hydrogen tank unit 39 in the vehicle width direction is larger than the length of the battery 40 in the vehicle width direction.

The configuration of the fuel cell vehicle 200 according to the second embodiment is advantageous in that it is unnecessary to prepare a hydrogen tank case conforming to the shape of the battery 40 and it can be applied to a vehicle having a center tunnel.

Furthermore, in the second embodiment, because the hydrogen tanks 30 cover the vertically lower side of the battery 40, it is possible to protect the vertically lower side of the battery 40 from an impact force. In addition, because the length of the hydrogen tank unit 39 in the vehicle width direction is larger than that of the battery 40 in the vehicle width direction, an impact force input from the side of the vehicle is transmitted to the side frame 13 on the opposite side through the hydrogen tank unit 39. Hence, it is possible to prevent the battery 40, serving as the protected component, from being directly subjected to the impact force.

Modifications

Figure 6:
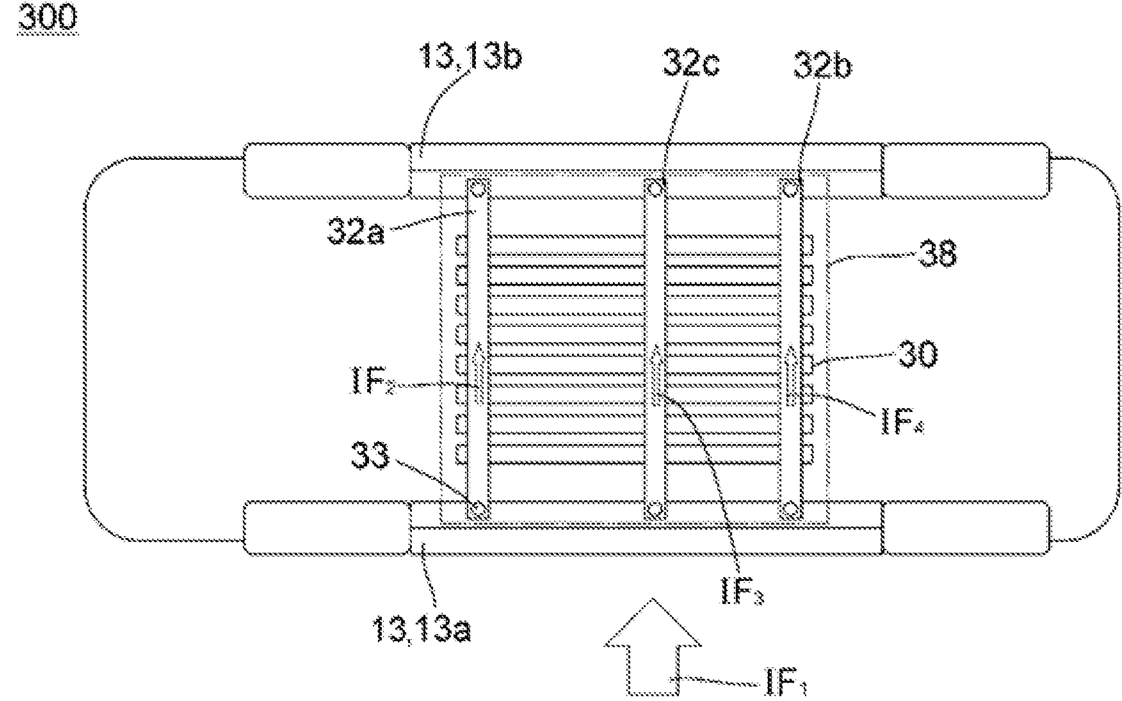
FIG. 6 is a schematic cross-sectional view of a fuel cell vehicle according to a modification, as viewed from the bottom.

Next, a fuel cell vehicle 300 according to a first modification of the disclosure will be described with reference to FIG. 6.

In the first embodiment, the hydrogen tanks 30 are accommodated in the hydrogen tank case 37, and the hydrogen tank case 37 is fixed to the side frames 13 of the vehicle body 10. This modification differs from the first embodiment in that the hydrogen tanks 30 are not accommodated in the hydrogen tank case. The hydrogen tank unit 39 according to this modification includes the hydrogen tanks 30 and the tank fixing brackets 32 that couple the hydrogen tanks to one another. Although three tank fixing brackets 32*a*, 32*b*, and 32*c* couple the bodies and ports 31 at both ends of the cylindrical tanks 30 in FIG. 6, the number of the tank fixing brackets and the positions where the hydrogen tanks are coupled are not limited thereto. The tank fixing brackets 32 are fixed to the side frame 13*a* on the right side and the side frame 13*b* on the left side of the vehicle body 10 with known fixing members, such as bolts 33. A known undercover 38 may be attached below the hydrogen tank unit 39.

In this modification, an impact force $IF_1$ input to the side frame 13*a* is divided into impact forces $IF_2$, $IF_3$, and IF 4 and transmitted to the tank fixing brackets 32*a*, 32*c*, and 32*b*. The impact forces $IF_2$, $IF_3$ and $IF_4$ are then transmitted to the side frame 13*b* coupled to the tank fixing brackets at the other end. Also in this modification, the impact force from the side is not directly input to the battery 40 disposed on the hydrogen tank unit 39. Thus, the protected component disposed on the hydrogen tank unit 39 is protected from an impact force from the side of the fuel cell vehicle 300. Because the hydrogen tank unit 39 is disposed below the battery 40, it is possible to protect the protected component from an impact force from below the fuel cell vehicle 300.

Although the embodiments and modification of the disclosure have been described above in detail with reference to the drawings, the disclosure is not limited to these examples. For example, in the embodiments and modification described above, the battery has been described as an example of the protected component. However, the protected component may be the fuel cell or the hydrogen supply component. Although separated hydrogen tanks 30 have been assumed in the description above, tanks communicating with each other at hydrogen storage regions may be used.

It is apparent that a person having ordinary skill in the art tries to make further modifications to the above-described embodiments and modification within the scope of the technical idea described in the claims, and it is understood that such modifications also belong to the technical scope of the disclosure.

According to the disclosure, it is possible to achieve even higher vehicle safety by controlling the arrangement of hydrogen tanks and high-voltage components.

The invention claimed is:

1. A fuel cell vehicle comprising:

a protected component comprising one or more of a battery, a fuel cell, and a hydrogen supply component; and a hydrogen tank unit comprising hydrogen tanks configured to store hydrogen gas used for power generation of the fuel cell, and a coupler coupling the hydrogen tanks to one another, the hydrogen tank unit being disposed so as to cover at least a vertically lower side of the protected component, wherein the hydrogen tank unit further comprises a hydrogen tank case accommodating the hydrogen tanks, the hydrogen tank case having a cross-section with at least one recess, and the protected component is disposed in the recess, and wherein the hydrogen tank case has a plurality of recesses in an upper portion thereof, and a plurality of batteries are respectively disposed in the plurality of recesses.

2. The fuel cell vehicle according to claim 1, wherein the hydrogen tank unit covers at least a portion of a side of the protected component.

3. The fuel cell vehicle according to claim 1, wherein the hydrogen tanks are cylindrical, and the hydrogen tank unit is formed by coupling ports of the cylindrical hydrogen tanks to one another with the coupler.

4. The fuel cell vehicle according to claim 2, wherein the hydrogen tanks are cylindrical, and the hydrogen tank unit is formed by coupling ports of the cylindrical hydrogen tanks to one another with the coupler.

5. The fuel cell vehicle according to claim 1, wherein the hydrogen tank unit is fixed to a pair of left and right side frames of a vehicle body via flanges of the hydrogen tank unit, and the protected component is disposed between the pair of side frames.

6. The fuel cell vehicle according to claim 1, wherein the hydrogen tanks are stacked in a height direction of the fuel cell vehicle with at least a portion inside the hydrogen tank unit, such that the hydrogen tank unit covers a vertically lower side and a lateral side of the protected component.

7. The fuel cell vehicle according to claim 1, wherein the hydrogen tank case is disposed below the protected component and fixed to a pair of left and right side frames of a vehicle body via flanges at opposite ends of the hydrogen tank case.

* * * * *